United States Patent
Fogel et al.

(10) Patent No.: US 10,840,811 B2
(45) Date of Patent: Nov. 17, 2020

(54) SYSTEM AND METHOD FOR POWER CONVERSION

(71) Applicant: Accion Systems, Inc., Boston, MA (US)

(72) Inventors: Paul Fogel, Boston, MA (US); Mikhail Filippov, Boston, MA (US)

(73) Assignee: Accion Systems, Inc., Boston, MA (US)

( * ) Notice: Subject to any disclaimer, the term of this patent is extended or adjusted under 35 U.S.C. 154(b) by 0 days.

(21) Appl. No.: 16/385,709

(22) Filed: Apr. 16, 2019

(65) Prior Publication Data

US 2020/0244173 A1 Jul. 30, 2020

Related U.S. Application Data

(63) Continuation of application No. 16/156,834, filed on Oct. 10, 2018, now Pat. No. 10,312,820, which is a (Continued)

(51) Int. Cl.
*H02M 3/335* (2006.01)
*H01J 27/02* (2006.01)
*H02M 1/00* (2006.01)

(52) U.S. Cl.
CPC .......... *H02M 3/335* (2013.01); *H01J 27/022* (2013.01); *H02M 2001/008* (2013.01)

(58) Field of Classification Search
CPC ... H05F 3/06; H01J 27/14; H01J 27/20; H01J 37/32137; H02M 7/493; H02M 3/285; (Continued)

(56) References Cited

U.S. PATENT DOCUMENTS 4,471,289 A  9/1984 Duley et al.
4,733,530 A  3/1988 Beattie et al.
(Continued)

FOREIGN PATENT DOCUMENTS

EP  2843789 A2  3/2015
WO  1999028624 A1  6/1999
WO  2017093906 A1  6/2017

OTHER PUBLICATIONS

Bost, Alexander Connor Larkin, "Materials for Small-Scale Space Propulsion Systems", Submitted to the Department Df Aeronautics and Astronautics at the Massachusetts Institute of Technology, Jun. 2017, 92 pages.

*Primary Examiner* — Gary L Laxton
(74) *Attorney, Agent, or Firm* — Jeffrey Schox; Diana Lin

(57) ABSTRACT

A polarity-selectable high voltage direct current power supply including a first drive assembly that transforms a first low voltage DC input into a first medium voltage alternating current output; a first HV output assembly that transforms the first LV AC output into a first HV DC output, wherein the first HV output assembly defines a first input stage; a polarity selector coupled between the second output junction of the first drive assembly and the first and second input stages of the first HV output assembly, the polarity selector operable between a first configuration and a second configuration; wherein in the first configuration the first HV DC output has a positive polarity; and wherein in the second configuration the first HV DC output has a negative polarity.

20 Claims, 6 Drawing Sheets

Related U.S. Application Data continuation of application No. 15/951,663, filed on Apr. 12, 2018, now Pat. No. 10,141,855.

(60) Provisional application No. 62/484,705, filed on Apr. 12, 2017.

(58) Field of Classification Search
CPC . H02M 3/335; H02J 1/10; H01T 23/00; F24F 2003/1692; Y01T 307/839
See application file for complete search history.

(56) References Cited

U.S. PATENT DOCUMENTS

| | | |
|---|---|---|
| 4,737,897 A | 4/1988 | Shipley et al. |
| 4,739,461 A * | 4/1988 | Komatsu .................. H02M 3/28 307/138 |
| 5,416,364 A | 5/1995 | Divjak |
| 5,826,030 A | 10/1998 | Hebert |
| 6,055,169 A | 4/2000 | Bowman et al. |
| 6,744,046 B2 | 6/2004 | Valaskovic et al. |
| 7,269,940 B2 | 9/2007 | Wiseman |
| 7,385,798 B2 | 6/2008 | Warren et al. |
| 8,063,336 B2 | 11/2011 | Gefter et al. |
| 8,467,204 B2 | 6/2013 | Agarwal et al. |
| 8,801,359 B2 | 8/2014 | Sherrer |
| 9,236,736 B2 | 1/2016 | Oyobe et al. |
| 9,510,431 B2 | 11/2016 | Oldynski et al. |
| 10,312,820 B2 * | 6/2019 | Fogel ................ H02M 3/33561 |
| 2006/0138997 A1 * | 6/2006 | Holmes ................... H02M 7/06 320/103 |
| 2009/0058319 A1 | 3/2009 | Berk et al. |
| 2009/0206660 A1 | 8/2009 | Makita et al. |
| 2013/0083563 A1 | 4/2013 | Wang et al. |

* cited by examiner

SYSTEM AND METHOD FOR POWER CONVERSION

CROSS REFERENCE TO RELATED APPLICATIONS

This application is a continuation of U.S. Pat. No. 10,141,855 filed 10 Oct. 2018, which is a continuation of U.S. Pat. No. 10,141,855, filed 12 Apr. 2018, which claims the benefit of U.S. Provisional Application Ser. No. 62/484,705, filed 12 Apr. 2017, each of which is incorporated herein in their entirety by this reference.

STATEMENT OF FEDERALLY SPONSORED RESEARCH AND DEVELOPMENT

This invention was made with government support under 15-C-0176 awarded by the Department of Defense. The government has certain rights in the invention.

TECHNICAL FIELD

This invention relates generally to the power processing field, and more specifically to a new and useful variable polarity controllable power supply system in the power processing field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
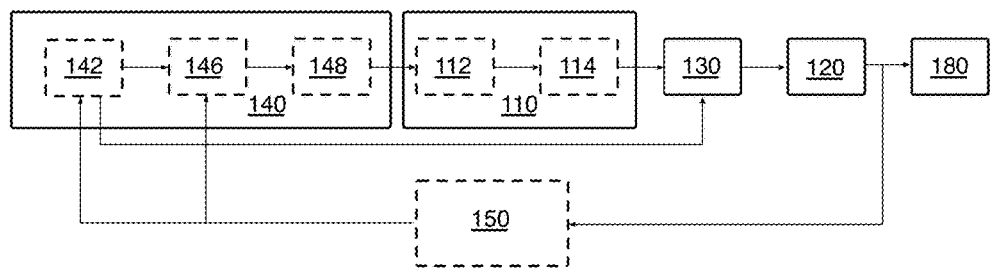
FIG. 1 is a schematic representation of a variation of the system.

As shown in FIG. 1, the system 100 includes: a drive assembly 110, an output assembly 120, and a polarity selector 130 coupled between the drive assembly 110 and the output assembly 120. The system 100 can also include: a controller 140, a feedback isolator 150, a housing 160, a power source 170, one or more loads 180, and any other suitable components for powering ion sources and/or generating ions.

The system 100 functions to provide polarity-switchable output power to one or more loads 180. The system can also function to provide feedback-controlled output power. The system can also function to provide high-voltage (HV) output power. The system can also function to provide direct current (DC) output. The system can also function to: convert low voltage (LV) power to HV power; mitigate (e.g., negate) accumulated charge imbalance, such as in cases wherein net input and/or output currents have an unpredictable or varying polarity; power one or more ion emitters (e.g., ion thrusters, ion sources, etc.); provide power for thrust generation for a spacecraft; generate thrust; provide power for ion-based processing tools (e.g., ion mills, semiconductor fabrication tools, etc.); and have any other suitable function related powering ion sources and/or generating ions.

Figure 10:
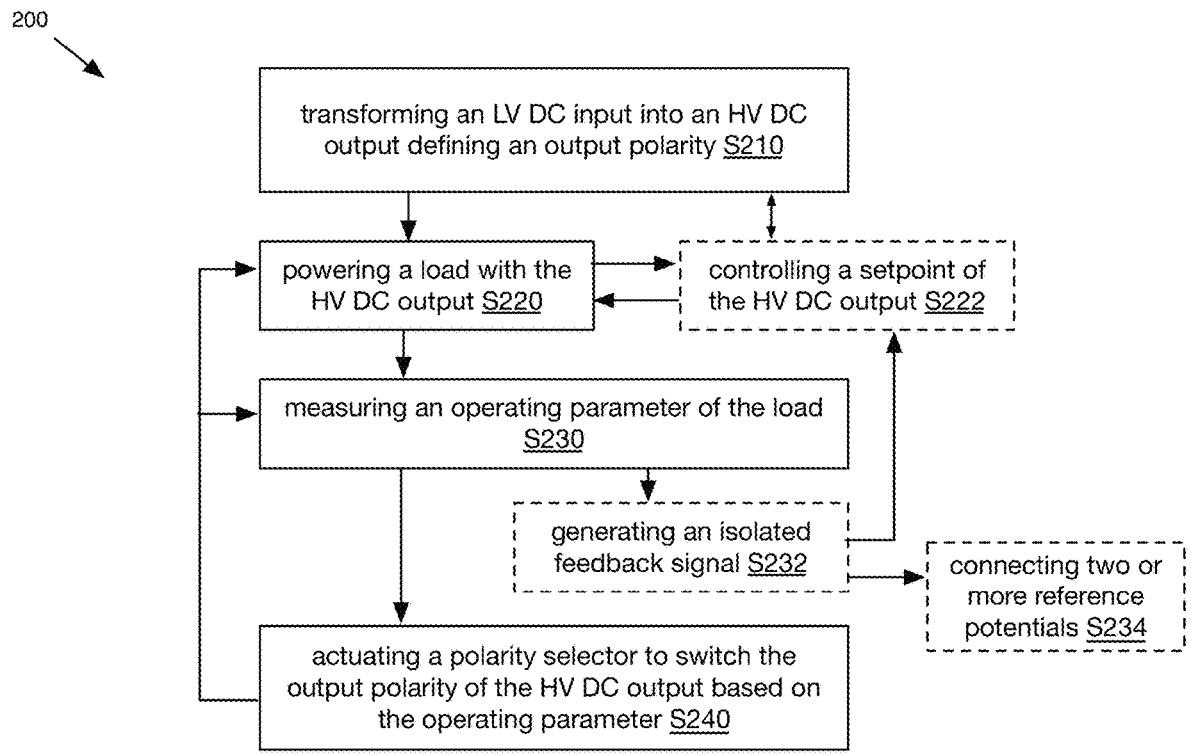
FIG. 10 is a flowchart of an example implementation of the method.
Figure 11:
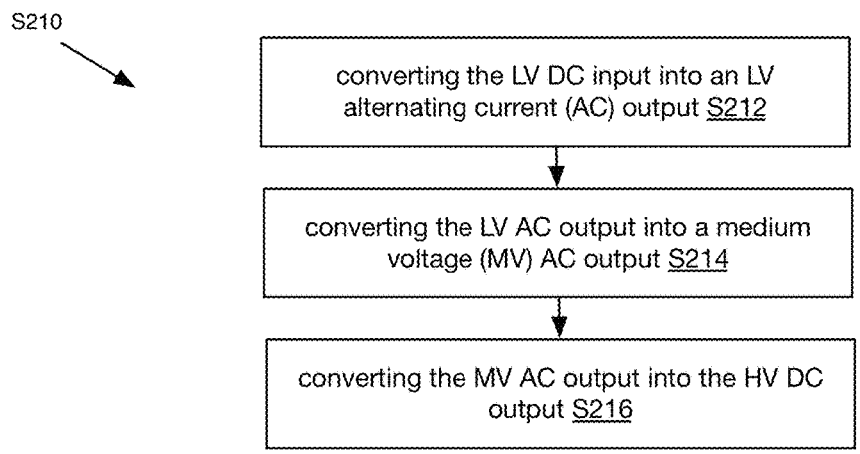
FIG. 11 is a flowchart of a portion of an example implementation of the method.

As shown in FIG. 10, the method 200 includes: transforming a LV DC input into an HV DC output defining an output polarity S210; powering a load with the HV DC output S220; measuring an operating parameter of the load S230; and actuating a polarity selector 130 to switch the output polarity of the HV DC output based on the operating parameter S240. The method 200 can additionally or alternatively include: controlling a setpoint of the HV DC output S222; generating an isolated feedback signal S232; and connecting two or more reference potentials S234.

The method 200 functions to provide polarity switchable power to one or more loads 180. The method 200 can also function to provide feedback-controlled output power. The method 200 can also function to provide HV output power, DC output power, and any other suitable output power. The method 200 can also function to: mitigate (e.g., negate) accumulated charge imbalance, such as in cases wherein net input and/or output currents have an unpredictable or varying polarity; power one or more ion emitters (e.g., ion thrusters, ion sources, etc.); provide power for thrust generation for a spacecraft, provide power for ion-based processing tools (e.g., ion mills, semiconductor fabrication tools, etc.), and have any other suitable function related to high voltage power provision.

2. Benefits

Variants of the technology can confer several benefits and/or advantages. First, variants can reduce wear on system components (e.g., loads, high-voltage active electrostatically charged components) while enabling efficient high-voltage operation (e.g., operation at high voltage for longer time than using other power sources) by allowing the polarity to be switched. For example, in cases wherein the load performance degrades over time while being powered by an output having a first polarity (e.g., due to a decrease in ion extraction efficiency, electrospray efficiency, etc.), switching the polarity of the power applied to the load can reset load performance to a baseline level (e.g., the performance level prior to the degradation due to continuous operation in a first polarity mode).

Second, variants of the technology can reduce the weight of weight-constrained vehicles (e.g., spacecraft, aircraft) by reducing the weight and/or number of components of the power supply, because M (e.g., any integer number M) output assemblies can be controlled using a single isolated feedback loop (e.g., instead of using M feedback-enabled output assemblies with M sets of feedback-related components).

Third, variants of the technology can enable provision of feedback-controlled, equal-current-magnitude, opposite-polarity high voltage power to an even number of loads (e.g., two electrostatic ion accelerators, four ion sources, etc.) to generate equal power dissipation (e.g., in generating thrust, in generating surface-treating ion beams, etc.) without accumulated charge imbalance (e.g., an increase of the magnitude of net charge of the system from which the ions are emitted).

Fourth, variants of the technology can siphon charge buildup (e.g., mitigate a buildup of space charge) from loads that build up static charge of unpredictable and/or varying polarity (e.g., aircraft in flight, vehicles moving through the air and isolated from a charge source/sink, etc.).

Fifth, variants of the technology can enable the application of switchable-polarity high-voltage electric fields to the outputs of electrostatic precipitators in order to extract charged and/or polarizable particulates from fluid streams (e.g., to extract and thereby reduce emitted pollutants and particulates).

Sixth, variants of the technology including adjustable-voltage outputs can enable ion implantation (e.g., for ions having similar charge per ion) at varying depths via electrostatic acceleration, and/or at similar depths (e.g., for ions having varying charge per ion).

Seventh, variants of the technology can provide a robust power supply and/or thrust system that can withstand the rigors of a space environment (e.g., thermal stress, radiation stress, etc.) as well as a launch environment (e.g., acoustic stress, vibration, etc.).

Eighth, variants of the technology can provide dual opposite-polarity outputs that cooperatively define a virtual ground (e.g., a floating center potential), such that other components of the system and related components can be electrically referenced to the virtual ground.

Ninth, variants of the technology can enable thrust vectoring using ion thrusters. The ion thrusters can be inherently charge-balanced (e.g., produce a net space charge of zero at the spacecraft, draw a net ion current of zero from the power supply, achieve charge neutrality in the overall ion output, etc.), or can be intentionally operated to produce or negate a net charge on the spacecraft (e.g., to negate an existing space charge, to intentionally produce a net space charge, etc.). For example, a first thruster and a second thruster can be arranged to produce a net torque on the spacecraft, while the first and second thruster draw equal and opposite ion currents. In another example, the first and second thruster can be arranged such that a net torque is produced on the spacecraft only when the ion currents drawn by each thruster are dissimilar (e.g., wherein ion current and thrust are directly proportional).

Tenth, variants of the technology can enable purely analog control of a balanced bipolar power supply. For example, an analog electrical circuit can be used to implement isolated analog feedback control of the output power. In another example, an analog electrical circuit can be used to implement analog feedback control without electrical isolation of the feedback signals from sense signals (e.g., output signals from input signals of the feedback controller 140). In these examples and related examples, analog control circuits can include networks of operational amplifiers and passive components arranged in any suitable manner. The analog control circuits can be manufactured as integrated circuits (e.g., system on chip, on a single chip, etc.), as printed circuit boards with integrated circuits and other components attached thereto, and/or as any suitable combination of the aforementioned integrated circuits and printed circuit boards, or in any other suitable manner of construction.

However, variants of the technology can additionally or alternatively provide any other suitable benefits and/or advantages.

3. System

As shown in FIG. 1, the system 100 includes: a drive assembly 110, an output assembly 120, and a polarity selector 130 coupled between the drive assembly 110 and the output assembly 120. The system 100 can also include: a controller 140, a feedback isolator 150, a housing 160, a power source 170, a plurality of drive assemblies, a plurality of output assemblies, one or more loads 180, and any other suitable components for powering ion sources and/or generating ions. The system is preferably capable of performing the method disclosed below, but can alternatively or additionally perform any other suitable method.

In variations, the system can include a plurality of drive assemblies and/or a plurality of output assemblies, mutually coupled in various ways. For example, the system can include multiple drive assemblies having a one-to-one correspondence with multiple output assemblies, each of the multiple drive and output assemblies connected to and controlled by a single controller 140 and a single feedback isolator 1500; however, there can be any other suitable correspondence between controller 140(s), feedback isolator(s), and one or more output and drive assemblies (e.g., two controller 140s connected to and controlling two pairs of output/drive assemblies, each controller 140 and each output assembly 120 connected to a single feedback isolator 150).

Components of the system are preferably radiation-hardened (e.g., operable in a space environment exposed to solar radiation, gamma-ray burst radiation, Van Allen radiation, etc.) but can alternatively be non-radiation hardened. Components of the system are also preferably adapted for any other thermal and physical stresses common to the space environment, such as rapid thermal cycling, radiative cooling, micrometeorite impacts, and the like; however, in alternative variations, the components can be adapted for operation in other environments imposing different thermal and physical stresses.

Variants of the system can be operable between several modes. In some variations, the system is operable in a bipolar output mode (e.g., two output assemblies are operated to generate equal and opposite high voltage outputs by the controller 140, which receives feedback from the feedback isolator 150, which receives sense signal inputs from the output of each output assembly 120). In some variations, the system is operable in a single output mode (e.g., a single output assembly 120 is operated to produce either a positive or negative polarity output, which is switchable and/or controllable during operation without cessation of power provision). In other variations, the system is selectively operable between the bipolar output mode (multiple output modes) and the single output mode (e.g., based on operation instructions, output feedback, etc.). In alternative variations, the system can be configured to operate any suitable number of output assemblies at any suitable output voltage and output polarity.

The system can be used with (or include) one or more of the following related systems, subsystems, or components (e.g., as loads, as input power sources, etc.): a charged-particle (e.g., ion) thruster (e.g., an ionic colloid thruster, electrospray thruster, etc.), which can include an electrostatic emitter array and an extractor grid; an ionic particle-removal fluid filter; and/or any other suitable system. The extractor grid of an ionic colloid thruster can be used in conjunction with one or more variants of the system by operating the grid at a high voltage (e.g., an extraction potential, 500 volts, 1 kilovolt, etc.) relative to the emitter, which can cause polarized droplets to form at the tip of each electrostatic emitter and to be expelled axially through and past the grid, creating thrust in the opposite direction. Droplets formed from the ionic liquid (e.g., conductive liquid, colloid) have a net charge, and the expulsion of the droplets can lead to charging of the system utilizing the thruster (e.g., spacecraft, aircraft, watercraft, etc.) unless equal and opposite charge is also removed from the system. Accordingly, such a thruster is preferably operated using multiple emitter arrays, with emitter-extractor potential differences energized to achieve equal and opposite extraction currents (e.g., with extractor grids charged at equal and opposite-polarity extraction potentials) to generate and accelerate ions, wherein the total net charge of the system after ion-expulsion is at or near zero (e.g., as near to zero as possible in order to prevent system charging). Such a thruster can additionally or alternatively be operated using a single-polarity array, wherein the charging polarity is periodically switched (e.g., from positive to negative, negative to positive) to mitigate space-charge buildup of the system (e.g., operated for equal time duration in each polarity mode to produce net-zero charge on the system after an even number of positive and negative-polarity operation periods). An ion thruster or electrospray thruster can additionally or alternatively be operated using the power processing system in any other suitable manner, including without switching the charging polarity. Variants of the power processing system as described herein can provide the features for operating ion thrusters in the manner described above, as well as any other suitable systems in any other suitable manner.

The system and components thereof can include circuits and sub-circuits, some or all of which can include ground connections. Such ground connections can include connections to Earth-ground, chassis ground, a battery terminal, a signal ground, a low voltage (LV) reference potential, an HV reference potential, and/or any other suitable reference potential. The system can include electrical connections to and between active and passive components. Each component in a serial connection can define an "upstream" connection point and a "downstream" connection point, wherein the upstream connection point is considered to be the point at which current flowing in the conventional current direction would enter the component if a positive polarity voltage difference were generated or produced across the component, and wherein the downstream connection point is considered to be the point at which conventionally flowing current would exit the component if a positive polarity voltage difference were placed across the component. For diodes and other nominally polarity-dependent or polarity-sensitive components, the upstream connection point is defined relative to the direction that current can pass through the component during normal operation (e.g., operation in the designed direction for the diode or similar polarity-dependent circuit component). Any of the system components and circuits can define junctions at which the components are coupled together (e.g., an input junction, an output junction, a pair of input junctions, a pair of output junctions, etc.), and/or where switches associated with various components (e.g., the polarity selector 130, the load coupler 124, etc.) alternately connect and/or disconnect components (e.g., selective thrusters, etc.) and circuits from one another.

3.1 Drive Assembly

The drive assembly 110 functions to convert input power (e.g., low voltage DC battery power) into a waveform suitable for rectification into the HV DC output. Accordingly, the waveform output by the drive assembly 110 is preferably a medium voltage (MV) alternating current (AC) waveform, wherein the peak-to-peak voltage is greater than a peak-to-peak voltage of the input signal but less than the voltage of the HV DC output. However, the drive assembly 110 can additionally or alternatively output any suitable waveform. The drive assembly 110 is preferably coupled between an input power source 170 and the polarity selector 130, such that operation of the drive assembly 110 is unchanged regardless of the output polarity of the output assembly 120 (e.g., determined by the state of the polarity selector 130). However, the drive assembly 110 can be otherwise suitably coupled to other system components. The drive assembly 110 can include an inverter 112 and a transformer 114.

The system can include a plurality of drive assemblies. In a variation, each drive assembly 110 of the plurality of drive assemblies can be associated with a respective output assembly 120, and separated therefrom by a single polarity selector 130 (e.g., wherein the single polarity selector 130 simultaneously determines the output polarity of each of the output assemblies using the switches of the polarity selector 132) or multiple polarity selector 130s (e.g., wherein a plurality of polarity selector 130s independently select the output polarities of the output assemblies). In specific example, the system includes a pair of drive assemblies coupled to a pair of output assemblies by a single polarity selector 130, and the output polarities of the pair of output assemblies are maintained in opposition by the polarity selector 130 (e.g., wherein the HV DC output of the first output assembly 120 is positive while the HV DC output of the second output assembly 120 is negative and vice versa). However, variations of the system including a plurality of drive assemblies can include any other suitable arrangements thereof.

The inverter 112 of the drive assembly 110 functions to convert the input power to an AC waveform (e.g., an LV AC output). The inverter 112 includes a set of switches, each of which is connected to the gate driver 146 by a signal pathway (e.g., an electrical pathway, a trace, etc.). The inverter 112 is also connected to the input power source 170, which is preferably a low voltage DC source (e.g., a battery, a photovoltaic panel, a 10 V source, 40 V source, 100 V source, or any other suitable voltage source). The output AC waveform of the inverter 112 is preferably a square wave (e.g., equal duty cycle square wave, unequal duty cycle square wave, etc.) that alternates between the positive or negative input voltage and ground. Alternatively, the output waveform can alternate between 0 V and the input voltage ($V_{in}$), between $+/-V_{in}/2$, or any other suitable voltages less than or equal to $V_{in}$. In further alternatives, the output waveform can be any suitable AC waveform (e.g., sinusoidal, a discrete approximation of a sine wave, asymmetric duty cycle square wave, saw wave, etc.).

The switches of the inverter function to selectively open and close portions of the inverter circuit to convert the low voltage DC input power to an AC output waveform (e.g., invert the input power). Each switch includes a control input (e.g., gate connection) that is connected to the gate driver 146 by a signal pathway. The gate driver 146 preferably controls (e.g., actuates) the switch to change state (e.g., change between an open and closed state, change between a closed and open state) to conductively connect (or disconnect) an upstream side of the switch with a downstream side of the switch. The switches can be any suitable type of switch (e.g., N-type or P-type transistors, MOSFETs, FETs, high speed solid-state relays, silicon-controlled rectifiers, or any other suitable switch).

Figure 2:
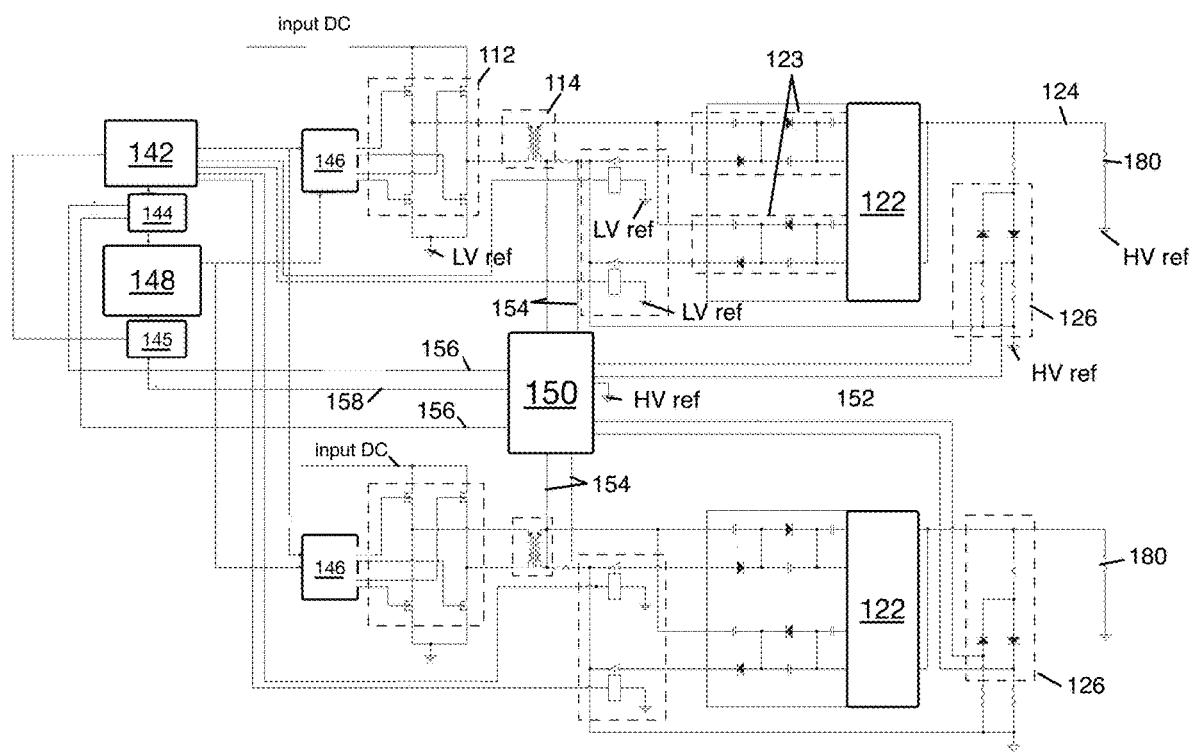
FIG. 2 is a schematic representation of a variation of the system with a full-bridge inverter.
Figure 3:
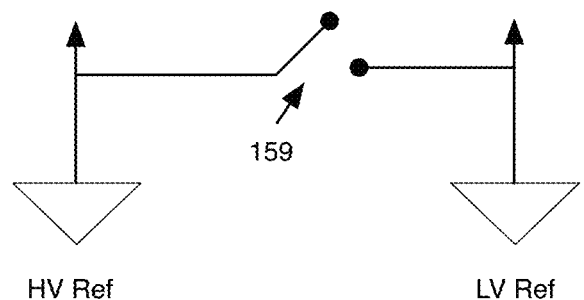
FIG. 3 is a schematic illustration of a crowbar switch of a variation of the system.
Figure 4:
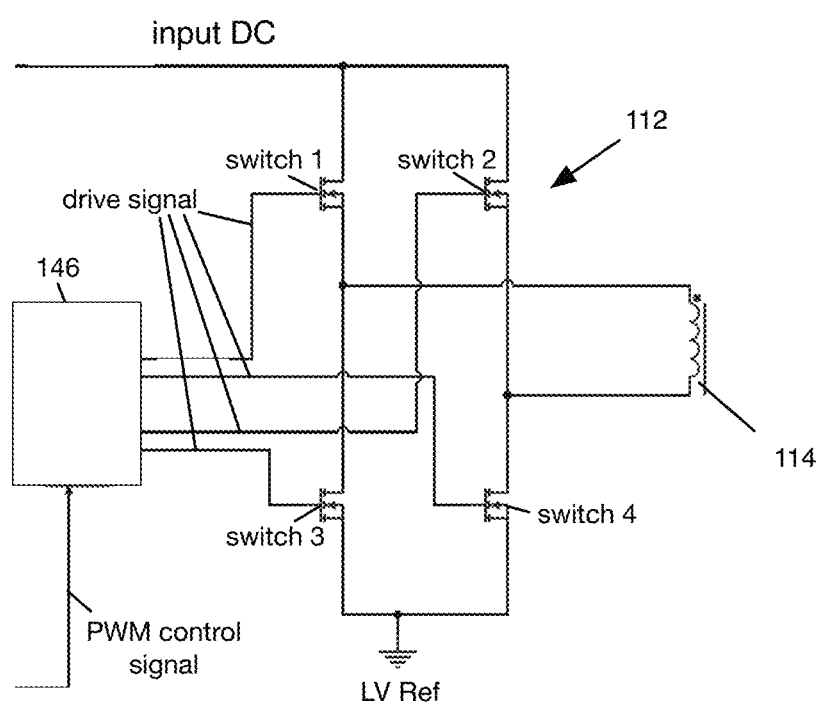
FIG. 4 is a schematic representation of an example full-bridge inverter of the system.

As shown in FIGS. 2 and 4, a first specific example of the inverter 112 is a full-bridge inverter 112 that includes four switches. In this example, the upstream side of the first switch is connected to the input power and the upstream side of the second switch. The downstream side of the first switch is connected to the high side (e.g., the side closest to the input power connection in the circuit between the input power and ground) of the transformer primary winding and the upstream side of the third switch. The upstream side of the second switch is connected to the input power and the upstream side of the first switch. The downstream side of the second switch is connected to the low side (e.g., the side farthest from the input power connection in the circuit between the input power and ground) of the primary winding of the transformer 114 and the upstream side of the fourth switch. The upstream side of the third switch is connected to the high side of the transformer primary winding and the downstream side of the first switch. The downstream side of the third switch is connected to ground and the downstream side of the fourth switch. The upstream side of the fourth switch is connected to the low side of the transformer primary winding and the downstream side of the second switch. The downstream side of the fourth switch is connected to the downstream side of the third switch and ground. Each switch has a gate connection that is connected to the gate driver 146 of the controller 140.

Figure 5:
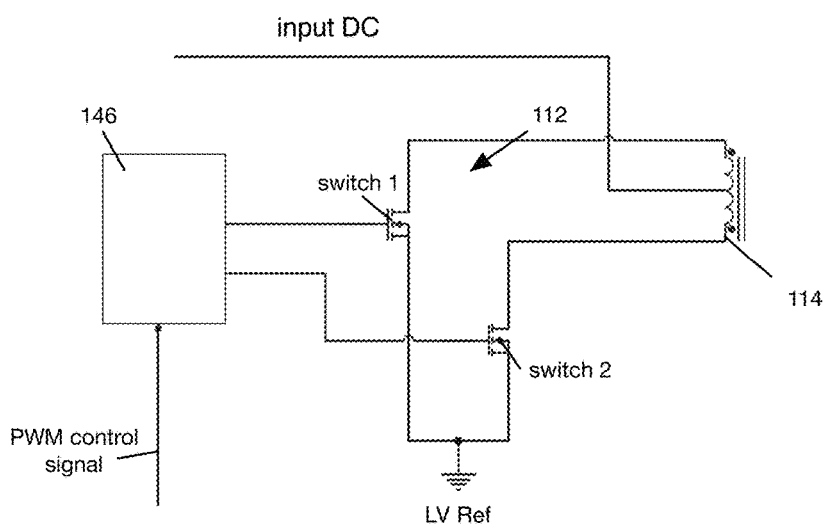
FIG. 5 is a schematic representation of an example half-bridge inverter of the system.

As shown in FIG. 5, a second specific example of the inverter 112 is a half-bridge inverter that includes two switches. The input power is connected to a center tap of the transformer primary winding. The upstream side of the first switch is connected to a first side of the transformer primary winding. The downstream side of the first switch is connected to ground and to the downstream side of the second switch. The upstream side of the second switch is connected to a second side of the transformer primary winding. The downstream side of the second switch is connected to ground and the downstream side of the first switch. Both switches have a gate connection that is connected to the gate driver 146 of the controller 140.

The transformer 114 of the drive assembly 110 functions to increase the voltage of the LV AC output of the inverter 112 to a medium voltage (MV) AC output. The transformer 114 includes a primary side and a secondary side, which are preferably a primary winding and a secondary winding but can alternatively take any suitable form. The windings can be made of any conductive material (e.g., copper) and can optionally include a ferrous core. Alternatively, the transformer 114 can be a ceramic piezo-transduction transformer, or any other suitable step-up transformer 114. The transformer 114 is preferably connected at the primary side to the inverter, and at the secondary side to the power rectifier 122 (preferably by way of the polarity selector 130 of the controller 140, but alternatively directly connected or otherwise suitably connected). The transformer 114 can be center-tapped (e.g., input power is connected at a center turn of the primary winding and the inverter 112 is connected at each end of the winding) or end-tapped (e.g., input power and ground are switchably connected to each end of the primary winding), or otherwise tapped in any suitable manner.

In a specific example of the drive assembly 110, the drive assembly 110 includes an inverter 112 and a step-up transformer 114. The inverter 112 is electrically coupled between a source of input power (e.g., an LV DC input) and a reference potential (e.g., a reference junction, a ground plane, etc.). The inverter 112 in this example transforms the input power (e.g., an LV DC input) into an output suitable for voltage increase by the transformer 114 (e.g., into a LV AC output). In this example, the inverter 112 is coupled to an input coil of the step-up transformer 114 which transforms the output received from the inverter 112 (e.g., the LV AC output) into a higher voltage alternating current output (e.g., an MV AC output).

However, the output assembly 120 can be otherwise configured, arranged, and/or used.

3.2 Output Assembly

The output assembly 120 functions to convert the output of the drive assembly 110 (e.g., a medium voltage AC waveform) into a high voltage direct current output defining an output polarity. The output polarity of the output assembly 120 is switchable by way of the polarity selector 130. The output assembly 120 includes a power rectifier 122. The output assembly 120 can also include a load coupler 124 and a sense signal rectifier 126. The output assembly 120 can also function to selectively couple and decouple a load to and from the output HV DC power, respectively, by way of the load coupler 124. The output assembly 120 can also function to produce a sense signal proportional to an operating parameter of the output power (e.g., and/or the load), such as the output voltage, output current, load voltage drop, load current, and any other suitable operating parameter, by way of the sense signal rectifier 126.

The power rectifier 122 of the output assembly 120 functions to convert the medium voltage AC waveform to a high voltage DC output. The power rectifier 122 can additionally function to provide polarity-selectable (e.g., via the polarity selector 130 of the controller 140) and magnitude-controllable (e.g., via a variable tap output) output voltage to a load. The power rectifier 122 can additionally function to multiply the magnitude of the input voltage in producing the output voltage (e.g., amplify the voltage, step-up the voltage). The system preferably includes a single power rectifier 122 per output assembly 120, but can alternatively include any suitable number of power rectifiers (e.g., cascaded/serial power rectifiers, parallel power rectifiers, or any combination thereof). The power rectifier 122 preferably includes one or more voltage doubling stages, and can optionally include a half-doubling stage and a variable-tap output; additionally or alternatively, the power rectifier 122 can include any suitable components for rectification. In a first variation, the power rectifier 122 includes an N-stage (e.g., 3 stage, 5 stage, 50 stage) voltage doubling ladder (e.g., with a maximum output voltage of 2N times the peak output voltage of the transformer secondary side) with a selectable (e.g., variable) tap output, that can be selectively connected (e.g., by the controller 140 in cooperation with a multi-position selectable switch) to a node between any two stages of the ladder, enabling any even integer multiple of the voltage input to the ladder to be obtained at the output. The power rectifier 122 preferably has a positive polarity input and a negative polarity input, each of which can be selectively coupled (e.g., by the polarity selector 130) to the secondary side of the transformer 114 to enable polarity-selectable output voltage at the output of the power rectifier; however, the power rectifier 122 can have any other suitable inputs, selectable or otherwise.

Figure 6A:
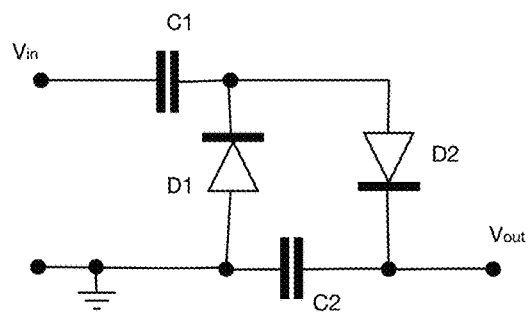
FIGS. 6A-B are schematic representations of voltage amplification stages of a portion of a variation of the system.

The voltage doubling stage of the power rectifier 122 functions to provide double the output voltage (e.g., relative to ground) as the voltage input to the stage. In a specific example, the voltage doubling stage includes two diodes and two capacitors. As shown in FIG. 6A, the upstream side of the first capacitor is connected to the input of the stage; the downstream side of the first capacitor is connected to the downstream side of the first diode and the upstream side of the second diode; the upstream side of the first diode is connected to ground and the upstream side of the second capacitor; and the downstream side of the second diode is connected to the downstream side of the second capacitor and the output of the stage. Any number of voltage doubling stages can be placed in series, wherein the output of the stage is the input to the next sequential stage, to achieve a 2N factor increase in the initial input voltage (i.e., where N is the number of stages).

Figure 6B:
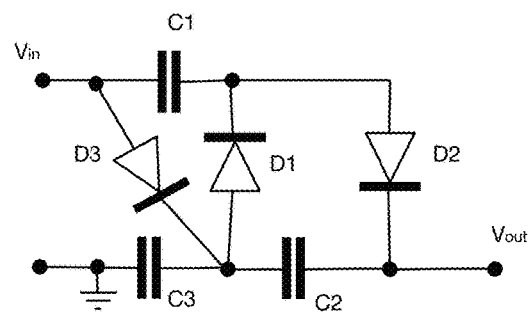

The power rectifier 122 can optionally include a half-doubling stage, which functions to enable odd-integer voltage level multiplication, when used in combination with a voltage doubling stage. In a specific example, the half-doubling stage includes a third capacitor and a third diode (in addition to the two capacitors and two diodes of a voltage doubling stage). As shown in FIG. 6B, the upstream side of the third diode is connected to the input to the stage and the upstream side of the first capacitor; the downstream side of the third diode is connected to the downstream side of the third capacitor, the upstream side of the first diode, and the upstream side of the second capacitor; and the upstream side of the third capacitor is connected to a ground connection (or other suitable reference potential). There is preferably a single half-doubling stage in sequence with the set of N voltage doubling stages, but there can alternatively be multiple half-doubling stages connected in any suitable manner, and/or half-doubling stages may be omitted in alternative variations of the power rectifier 122.

The power rectifier 122 can optionally include a variable-tap output, which functions to allow the output voltage of the power rectifier 122 to be selected from the available node voltages of the N-stage voltage ladder (e.g., by adjusting which two stages the upstream side of the output connection is electrically connected to). For example, the power rectifier 122 can include a multiposition switch (e.g., a rotary switch, transistor network, relay network, etc.) that is controllable by the controller 140 to connect the output of the power rectifier 122 to any connection between any two stages of the N-stage voltage ladder of the power rectifier 122.

The load coupler 124 of the output assembly 120 functions to electrically connect the load to the power output (e.g., junction) of the power rectifier 122. The load coupler 124 can be a permanent coupler (e.g., a solder joint, a permanent connector, etc.), a controllable (e.g., switchable) coupler (e.g., a switch, a relay, a controllable spark gap switch, an arc switch, etc.), and any other suitable coupler. In variations of the output assembly 120 including a load coupler 124, the load coupler 124 can be controlled (e.g., by the controller 140) in addition to and/or as an alternative to switching the output polarity (e.g., to cease powering the load instead of and/or in addition to switching the output polarity of the output assembly 120 coupled to the load).

The sense signal rectifier 126 of the output assembly 120 functions to rectify the signal detected at the output of the power rectifier 122 in order to provide a sense signal (e.g., to a feedback isolator 150) that does not depend on the polarity of the output of the power rectifier 122. The signal rectifier 126 can additionally function to electrically isolate the output of the power rectifier 122 (e.g., the voltage sense input) from the controller 140 and/or other portions of the system. In a specific example, as shown in FIG. 2, the signal rectifier 126 includes a first shunt resistor, connected between the power rectifier output and the inputs of two parallel, oppositely-directed diodes, each diode connected to ground across a second and third shunt resistor, respectively. A negative sense output is connected between the second shunt resistor and the voltage sense input 152 of the feedback isolator 150, and a positive sense output is connected between the third shunt resistor and the voltage sense input 152 of the feedback isolator 150. Accordingly, a positive voltage sense input 152 is received at the feedback isolator 150 regardless of the output polarity of the power rectifier 122.

However, the output assembly 120 can be otherwise configured, arranged, and/or used.

3.3 Polarity Selector 130

The polarity selector 130 functions to select the output polarity of the output assembly 120 (e.g., the output polarity of the HV DC output of the output assembly 120). The polarity selector 130 is preferably controlled by the controller 140 (e.g., based on an output control signal generated by the controller 140), but can be otherwise suitably controlled. The polarity selector 130 is preferably electrically connected (e.g., permanently connected, selectively connectable by a switch, etc.) between the drive assembly 110 and the output assembly 120, but can be otherwise connected.

Figure 9:
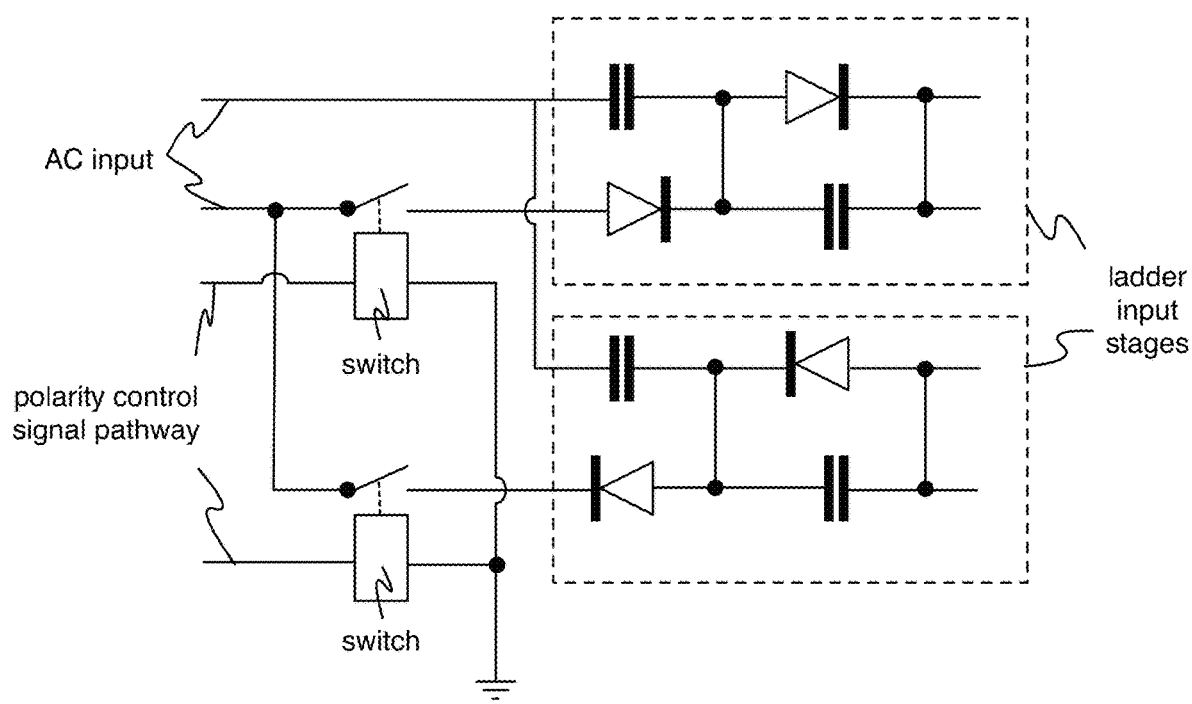
FIG. 9 is a schematic representation of polarity-selectable input stages of a portion of a variation of the system.

In an example configuration, as shown in FIG. 9, the polarity selector 130 can include a pair of single-pole, single-throw (SPST) relays that connect the secondary winding of the transformer 114 between ground and either the positive or negative polarity inputs of the power rectifier, respectively, and each SPST is either in a closed or open state based on the output polarity control signal. In related examples, the polarity selector 130 can include two or more SPST relays or one or more single-pole, double throw (SPDT) relays in a latching configuration. However, the polarity selector 130 can include any suitable switches for redirecting the output of the secondary winding of the transformer 114 (e.g., solid state relays, MOSFETs, BJT transistors, etc.).

In another example configuration, the polarity selector 130 includes a double pole, double-throw (DPDT) relay that is arranged between the secondary windings of two transformers, each transformer 114 associated with a different drive assembly 110, and the input stages of two output assemblies (e.g., one throw of the relay is coupled between each drive assembly 110 and output assembly 120). In this example, when the DPDT relay is in a first of two switch positions, the first output assembly 120 defines a positive output polarity and the second output assembly 120 defines a negative output polarity, and when the DPDT relay is in a second of two switch positions, the first output assembly 120 defines a negative output polarity and the second output assembly 120 defines a positive output polarity. Thus, with a single control signal operating the DPDT relay, the output polarity of a pair of output assemblies can be switched back and forth while the output polarities remain in opposition (e.g., one negative and one positive output).

In another example configuration, the polarity selector 130 is coupled between one of two output junctions of the drive assembly 110 and the positive and negative input stages 123 of the output assembly 120. In this example, the polarity selector 130 includes a set of switches operable between a first configuration and a second configuration. In the first configuration, the set of switches directly electrically connects the output junction to the positive input stage and electrically isolates the output junction from the negative input stage, such that the output polarity of the output assembly 120 is positive. In the second configuration, the set of switches directly electrically connects the output junction to the negative input stage and electrically isolates the output junction from the positive input stage, such that the output polarity of the output assembly 120 is negative. In this example configuration, a load connected downstream of the output assembly 120 can remain connected and operational during polarity selection, such as in cases wherein the load can perform a function irrespective of the polarity of its input power (e.g., wherein the load is an ion accelerator that can accelerate both positive and negative ions from the same propellant source).

However, the polarity selector 130 can be otherwise configured and/or connected to the system components.

3.4 Controller

The controller 140 functions to set the output voltage, current, and polarity of the output assembly 120. The controller 140 can additionally function to receive external commands (e.g., manually or automatically generated by a ground control system or team, automatically generated by a command module of a spacecraft). The controller 140 can additionally function to provide operational data (e.g., state information regarding the system, real time performance and/or power consumption of the system and/or loads thereof, the output current and/or voltage transmitted to a load, etc.) to other related systems (e.g., a spacecraft computer, command module, a ground control system, a flight computer, etc.). The controller 140 is communicatively coupled to (and controls) the inverter 112 of the output assembly 120, the feedback isolator 150, and to the secondary side of the transformer 114 of the output assembly 120. The controller 140 is preferably coupled to the inverter 112 by direct electrical connections (e.g., wires, traces) but can be otherwise coupled. The system preferably includes a single controller 140, but can alternatively include any number of controllers. The system preferably includes a single controller 140 per output assembly 120, but can alternatively include a single controller 140 per pair of two output assemblies or any other suitable ratio of controllers to output assemblies and/or other components of the system. The controller 140 preferably includes a microcontroller 142, a first combiner 144, a second combiner 145, and a gate driver 146, but can include any other suitable component. The controller 140 can optionally include a PWM controller 148, as well as any other suitable controller (e.g., a field-programmable gate array/FPGA, an analog feedback controller, etc.).

The controller 140 can optionally include a PWM controller 148, which can function to control the gate driver 146 based on combined command signals received from the first and second combiners. The PWM controller 148 can also function to directly control switches of the inverter (e.g., bypassing the gate driver in cases wherein a gate driver is omitted from the system or in cases wherein the gate driver is included and is bypassed for any suitable reason), and/or to control any other suitable switches of the system. The PWM controller 148 can additionally function to control the gate driver 146 based on the operating mode of the system (e.g., current-controlled mode, voltage-controlled mode), which can correspond to different output waveforms of the PWM controller 148 (e.g., fixed frequency and variable duty cycle square-wave output in voltage-controlled mode, fixed duty cycle and variable frequency square-wave output in current-controlled mode, etc.). In a first variation, the PWM controller 148 outputs a control signal to the gate driver 146 with a signal characteristic (e.g., RMS magnitude, frequency) that is selected in response to variation of the current feedback signal away from a current set point (e.g., desired output current magnitude); in a second variation, the control signal characteristic is selected in response to variation of the voltage feedback signal away from a voltage set point (e.g., desired output voltage). In both these variations and related variations, the output of the PWM controller 148 is determined based on (e.g., in response to, in direct relation to) the combined voltage and/or current command signals received from the first and/or second combiners (e.g., the output is feedback-controlled). However, the output of the PWM controller 148 can be otherwise determined.

The controller 140 can be operable between several modes. The controller 140 can be operated in a direct PWM mode, wherein the microcontroller 142 provides PWM control signals directly to the gate driver 146 (e.g., without feedback and without a PWM controller 148); alternatively, the controller 140 can include the PWM controller 148 and the PWM controller 148 provides PWM control signals (e.g., generated based on feedback) to the gate driver 146. The controller 140 can be operated in positive (or negative) output polarity mode, wherein the controller 140 selectively completes a circuit (e.g., using a SPST relay, or any other suitable relay or switch) between the secondary side (e.g., output) of the transformer 114 and the positive (or negative) polarity input of the power rectifier, which results in current flow through the power rectifier 122 such that the output potential of the power rectifier 122 is positive (or negative). In one variation, the controller 140 preferably provides 2*M polarity control signals to 2*M single-pole single-throw (SPST) relays, where M is the number of output assemblies controlled by the controller 1400. However, the controller 140 can alternatively provide M polarity control signals to M dual-pole single-throw (DPST) relays, or provide any other suitable number of polarity control signals. The controller 140 can be operable in feedback control mode (e.g., voltage controlled, current controlled), wherein the microcontroller 142 provides a voltage command signal to the first combiner 144, which receives M voltage feedback signals from the feedback isolator 150 and generates and provides a combined voltage command signal to the PWM controller 148. The microcontroller 142 also generates and provides a current command signal to the second combiner 145, which receives a current feedback signal from the feedback isolator 150 and generates and provides a combined current command signal to the PWM controller 148. In a related variation, the feedback control mode can include receiving feedback signals bypassing an isolated amplifier (e.g., bypassing the feedback isolator), such as directly from a sense output of a transformer (e.g., a third winding within the transformer that outputs a voltage sense signal proportional to the output of the step-up winding), an output of another component (e.g., the high voltage output assembly, a sense output of the HV output assembly, etc.), and from any other suitable location and/or junction in the system. The PWM controller 148 preferably provides control signals to M gate drivers based on the combined current and/or voltage command signals (e.g., when operated in current-controlled mode and/or voltage-controlled mode), but can alternatively provide control signals to any number of gate drivers. Each gate driver 146 generates P drive signals, wherein P is equal to the number of switches in the inverter 112 (e.g., P=4 for a full bridge inverter, P=2 for a half bridge inverter), and provides the P drive signals to the gate terminals of the switches (e.g., MOSFETs) of the inverter 112 according to the control signals received from the PWM controller 148. In variations, each gate driver 146 can alternatively generate a single drive signal (e.g., wherein P=1). Each of the signals described above (e.g., control signals, command signals, feedback signals) can be analog or digital, at any suitable voltage level (e.g., TLL voltage, 3.3 volts, etc.), and can correspond to any suitable data transfer protocol or format (e.g., binary logic levels, I2C, modulated waveform, etc.). Signals are preferably transmitted over direct electrical connections (e.g., wires, conductive pathways, traces) but can alternatively be otherwise transmitted (e.g., wirelessly, such as through inductive coupling).

The microcontroller 142 functions to generate control outputs, and to transmit control outputs to other components of the system. The microcontroller 142 can additionally function to receive external instructions, execute preprogrammed instructions, or any combination thereof. The microcontroller 142 can be implemented in hardware in various ways, such as in a CPU, an ASIC, an FPGA, an embedded controller chipset, and in any other suitable hardware implementation. The microcontroller 142 is preferably electrically connected to each output assembly 120 by one positive and negative output control pair, to the first combiner 144 by a signal pathway, and to the second combiner 145 by a signal pathway. However, the microcontroller 142 can be otherwise connected. The microcontroller 142 can optionally be directly connected to the gate driver 146 (e.g., for operation in direct PWM control mode) by a signal pathway, and/or optionally directly connected to any suitable switch (e.g., a switch of the inverter, a switch of the polarity selector, a digital-input MOSFET, a BJT, etc.).

The first combiner 144 functions to combine voltage feedback signals and the voltage control command signal to generate the combined voltage command signal, and to provide the combined voltage command signal to the PWM controller 148. As such, the first combiner 144 is connected to the feedback isolator 1500 by a number of signal pathways equal to the number of voltage feedback signals (e.g., one per output assembly 120) and to the microcontroller 142 by a signal pathway (e.g., over which the voltage command signal is transmitted). In a specific example, the first combiner 144 includes: a first summing junction at which a first voltage feedback signal is summed with an inverted voltage command signal to generate a first residual signal; a second summing junction at which a second voltage feedback signal is summed with the inverted voltage command signal to generate a second residual signal; a comparator junction connected to the outputs of the two summing junctions at which the residual signal (e.g., error signal) with the greatest magnitude is selected and provided as an output (e.g., the combined voltage command signal) to the PWM controller 148. In related examples, the first combiner 144 can include an averaging junction (e.g., wherein a number of feedback signals are received and averaged instead of and/or in addition to summed), in addition to and/or in lieu of a summing junction, wherein signals are averaged to generate an output signal (e.g., an output feedback signal).

The second combiner 145 functions to combine the current feedback signal and the current command signal to generate the combined current command signal, and to provide the combined current command signal to the PWM controller 148. As such, the second combiner 145 is connected to the feedback isolator 150 by a signal pathway and to the microcontroller 142 by a signal pathway (e.g., over which the current command signal is transmitted). In a specific example, the second combiner 145 includes: a summing junction at which the current feedback signal is summed with an inverted current command signal to generate a residual signal which is provided as an output (e.g., the combined current command signal) to the PWM controller 148.

The gate driver 146 functions to control and power (e.g., drive) the inverter 112 (e.g., the switches of the inverter) of the drive assembly 110. The gate driver 146 integrated into the controller 140 (e.g., connected to a PWM controller 148 of the controller, connected to a microcontroller 142 of the controller, etc.) by one or more signal pathways, and to the inverter 112 by a number of signal pathways corresponding to the number of switches of the inverter. There is preferably a single gate driver 146 per inverter, but can additionally or alternatively be any suitable number of gate drivers associated with any suitable number of inverters (e.g., a single gate driver 146 per switch of each inverter, a single gate driver 146 for all switches of multiple inverters, etc.). The gate driver 146 preferably outputs PWM square-wave signals at a voltage level and current capacity at which the switches of the inverter 112 are designed to operate (e.g., according to manufacturer specifications, 3.3 volts peak to peak, 5 volts peak to peak, etc.) but can alternatively output any suitable drive signals at any suitable power levels. The output characteristics (e.g., voltage level, current level, pulse widths, pulse frequency, etc.) are preferably determined by the PWM controller 148, but can alternatively be determined by the microcontroller 142 or otherwise suitably determined. Drive signals are preferably carried over signal pathways connecting the gate driver 146 and the inverter 112 (e.g., switches of the inverter), but can be otherwise carried or transmitted. Each drive signal is preferably carried over a single signal pathway, but alternatively multiple drive signals may be multiplexed over a single signal pathway and/or a branched signal pathway; however, drive signals can be otherwise suitably carried. The gate driver 146 preferably outputs a number of drive signals equal to the number of switches of the inverter 112 (e.g., two drive signals for an inverter 112 including a half-bridge, four drive signals for an inverter 112 including a full-bridge), but can alternatively output any suitable number of drive signals associated with any suitable number of switches.

In a specific example, the controller 140 is communicatively coupled to an output junction of the output assembly 120 (e.g., an HV output junction) and to the polarity selector 1300. In this example, during operation, the controller receives a feedback signal proportional to the magnitude (e.g., voltage magnitude, current magnitude, etc.) of the HV DC output of the output assembly 120, and operates the polarity sector based on the feedback signal (e.g., to select the output polarity of the output assembly 120). Operating the polarity selector 130 based on the feedback signal can include: switching the polarity based on the magnitude of the output falling below a threshold value (e.g., an ion current threshold indicative of decreasing load performance); maintaining the output polarity based on the magnitude of the output falling within a threshold range (e.g., a nominal voltage range indicative of operation within an acceptable deviation from the set point); and otherwise suitably operating the polarity selector 130.

However, the controller 140 can be otherwise configured, arranged, and/or used.

3.5 Feedback Isolator

The feedback isolator 150 of the system functions to convert feedback of either positive or negative polarity that originates from the output assembly 120 into feedback of a single polarity, for provision to the controller 140 as a feedback input. The single polarity is preferably positive polarity, but can alternatively be negative. The feedback output by the feedback isolator 150 is preferably referenced to a different reference potential than the signals received by the feedback isolator 150 (e.g., sense signals received from the output assembly 120), but can be referenced to the same reference potential as the feedback isolator 150, the reference potential for the drive assembly 110, the reference potential for the polarity selector 130, or to any other suitable reference potential. The feedback isolator 150 includes a signal rectifier 126, one or more voltage sense inputs 152, one or more current sense inputs 154, a current feedback output 158, and one or more voltage feedback outputs 156. The system preferably includes a single feedback isolator 150, even for cases in which there are multiple output assemblies, but there can alternatively be any suitable number of feedback isolators. The feedback isolator 150 is connected to sensor outputs of the secondary side of each transformer 114 (e.g., to sense the output current) and to sensor outputs at the output of each power rectifier 122 (e.g., to sense the output voltage) by signal pathways, as well as to the controller 140 by one or more signal pathways (e.g., for transmitting feedback signals); additionally or alternatively, the feedback isolator 150 can be otherwise connected to components of the system in order to receive and/or transmit signals (e.g., feedback signals).

The voltage sense inputs 152 of the feedback isolator 150 function to receive the voltage sensor signals from the sense signal rectifier 126 of the output assembly 120, and thus are preferably connected via signal pathways to the signal rectifier 126. However, the voltage sense inputs 152 can be otherwise connected.

The current sense inputs 154 of the feedback isolator 150 function to receive the current sense signal from the output assembly 120 (e.g., the secondary side of the transformer). In a first specific example, the current sense signal is generated by a voltage across a shunt resistor connected between the low side of the transformer secondary winding and ground, and the current sense input 154 receives the current sense signal as a double-ended voltage signal across the shunt resistor. However, the current sense signal can be otherwise generated (e.g., at the high voltage output, at a third winding of a transformer, etc.).

The feedback outputs (e.g., current feedback outputs, voltage feedback outputs) of the feedback isolator 150 function to provide feedback signals to the first and second combiners of the controller 140. The system preferably includes M voltage feedback outputs 156, where M is the number of output assemblies connected to the feedback isolator 150, but the system can alternatively include any suitable number of voltage feedback outputs 156 connected to the first combiner 144. The system preferably includes a single current feedback output 158 (e.g., for use in controlling a single input power source), but there can alternatively be any suitable number of current feedback outputs 158 connected to the second combiner.

In some variants, the system can include a crowbar switch 159 that functions to connect one or more reference potentials used in various components of the system. In an example, the crowbar switch 159 is operable between a first mode and a second mode by the controller 140, wherein in the first mode the crowbar switch 159 directly electrically connects the HV reference potential (e.g., the reference potential to which the output power of the output assembly 120 is referenced) and the LV reference potential (e.g., the reference potential to which outputs of the controller 140 and/or feedback isolator 150 are referenced, a signal ground plane reference, etc.), and wherein in the second mode the crowbar switch 159 electrically isolates the HV reference potential and the LV reference potential. This variation can be used to selectively switch the system from an analog or passive charge-balancing mode to a digital or active charge-balancing mode, wherein the controller 140 can actively control charge balancing (e.g., by computing and controlling the drive assemblies based on output feedback). Additionally or alternatively, this variation can be used to monitor the load health. For example, the crowbar switch 159 can be operated in the second mode, wherein the current drawn by the load can be monitored and used to determine whether the load is operational (e.g., considered operational when the current exceeds a threshold value, and considered nonoperational when the current falls below the threshold value). The crowbar switch 159 can include various types of switches, such as: a relay, a latch, a solenoid-controlled gap, a transistor, a thyratron, and any other suitable switch for connecting two electrical conductors to remove the potential difference between the two conductors. In additional or alternative variations, the crowbar switch 159 can include a network of switches, which can function to connect and/or disconnect multiple isolated references (e.g., two or more reference potentials) in any suitable manner (e.g., wherein a subset of reference potentials are equalized via crowbar switch connection and a distinct subset remain isolated, wherein all reference potentials are equalized, etc.).

3.6 Power Source

The system can optionally include a power source 170, which functions to provide input power to the inverter 112 for subsequent upconversion to high voltage by the transformer 114 and power rectifier 122. The power source 170 can additionally function to power the controller 140 (e.g., including DC-DC regulation of the power source 170 to appropriate power levels for the controller 140). The system preferably includes a single power source 170, but there can alternatively be multiple (e.g., each connected to the same inverter 112 and/or controller 140 permanently, or controllably by a switch; alternatively they may be connected to different inverters and/or controllers, permanently or controllably by switches). In a first variation, the power source 170 is a rectified DC voltage from an AC source (e.g., an alternator). In a second variation, the power source 170 is a regulated DC source (e.g., a battery, a DC voltage regulator). In a third variation, the power source 170 is a fluctuating and/or uncontrolled DC source (e.g., an unconditioned or partially-conditioned solar panel output). In a fourth variation, the power source 170 is an AC source (e.g., in variations of the system without an inverter, in variations of the system with an additional rectification stage between the power source 170 and the inverter) such as wall power, an alternator, or any other suitable AC source.

3.7 Housing

The system can optionally include a housing 160, which functions to enclose and shield at least a portion of the power processing system. The housing 160 can additionally function to define throughputs (e.g., feedthroughs) for power transmission lines to pass into and out of the housing 160 and connect to various sources and/or loads 180. The housing 160 can additionally function to define throughputs (e.g., feedthroughs) for control and/or data transmission lines to pass into and out of the housing 160 and connect to various components of the system. The housing 160 can additionally function to passively transport heat (e.g., among components, away from components, toward components, etc.). For example, the housing 160 can define heat conduction elements and/or support elements configured to conduct heat away from portions of electronic components dissipating electrical energy as heat toward other regions of the system (e.g., to the external surface of the housing such that it radiates away, to components that are colder than their optimal temperature operating range, etc.). However, the housing 160 can additionally or alternatively transport thermal energy in any suitable manner, by way of any suitable elements and/or defined morphological features.

The housing 160 is preferably configured to provide structural support to and an enclosure for components of the power processing system, but can alternatively be otherwise configured. The housing 160 preferably has a form factor configured for integration into a standard satellite bus (e.g., a 1 U cubesat, a 3 U cubesat, a nanosatellite, a kilowatt-class telecom satellite, etc.), but can additionally or alternatively have any suitable form factor. As such, the housing 160 can include the flanges, bolt patterns, physical layouts, standoffs, and any other suitable features that conform to standards and/or regulations regarding spacecraft integration. The housing 160 preferably provides shielding against solar and other space radiation (e.g., through the use of a radiation-hardened material casing, a specified wall thickness, etc.), but in variations can alternatively provide minimal radiation shielding.

3.8 Loads

The system can optionally include a primary load 182, which functions to receive and dissipate the output power of the power rectifier 122. The primary load 182 is electrically connected to the output of the output assembly 120 (e.g., the selected variable-tap output of the N-stage voltage doubler of the power rectifier) between the high voltage output and ground. The system preferably includes a single primary load 182 per output assembly 120, but can additionally or alternatively include multiple primary loads 182 per output assembly 120, multiple output assemblies connected to a single primary load 182, or any other suitable correspondence between any number of primary loads and any number of output assemblies. The primary load 182 can, in variations, have an operating voltage limit (e.g., a breakdown voltage, a voltage above which operational efficiency drops below a threshold), which can, in variations, be less than the maximum output voltage of the output assembly 120. The operating voltage limit can be prescribed and static in time, but can alternatively change with time (e.g., as components wear). There is preferably a single primary load 182 per output assembly 120, but there can alternatively be any suitable number of primary loads connected to an output assembly 120 (e.g., via a multiplexer between the output assembly 120 and a plurality of primary loads).

In a first specific example, the primary load 182 includes an ion source. The ion source includes a body (e.g., an emitter body) that includes a base and a tip. The body can be made of a porous material (e.g., a microfabricated emitter body formed from a porous metal substrate) compatible with an ionic liquid or a room temperature molten salt (e.g., does not react or result in electrochemical decaying or corrosion). The body can be mounted relative to a source of ionic liquid or a source of a room temperature molten salt. The body can include a pore size gradient that decreases from the base of the body to the tip of the body, such that ionic liquid can be transported through capillarity (e.g., through capillary forces) from the base to the tip; however, ionic liquid can additionally or alternatively be transported through capillarity without a pore size gradient or by any other suitable transport mechanism. The ionic liquid can be continuously transported through capillarity from the base to the tip so that the ion source (e.g., emitter) avoids liquid starvation. An electrode can be positioned downstream relative to the body. The output assembly 120 of the power processing unit can apply high voltage to the body relative to the electrode, thereby emitting a current (e.g., a beam of ions) from the tip of the body. The application of a voltage can cause emission of ions from the tip (e.g., via formation of a Taylor cone at the tip). In a related example, the ion source can include a plurality of emitters in a 1D or 2D array, wherein each emitter is microfabricated substantially as described above. The emitters of the array can have an emitter spacing of less than about 1 mm, or any other suitable spacing; the spacing between emitters may limit the maximum voltage that can be applied due to field-enhancement effects generated at the emitter tips (however, the spacing between emitters may alternatively have no effect on the applicable maximum voltage).

The system can optionally include a secondary load 184, which functions to receive and dissipate voltage(s) produced by the power processing system that are greater than the voltage applied to the primary load 182. In a first variation, the primary load 182 is connected to the output assembly 120 and receives an output voltage selected by the controller 140 (e.g., using a variable-tap output) that is less than the maximum output voltage of the output assembly 120 (e.g., the primary load is powered at $100*V_{in}$ wherein the output assembly 120 can produce $300*V_{in}$); the secondary load 184 can then be connected to the output assembly 120 at a secondary output connection that provides the maximum output voltage (e.g., $300*V_{in}$). In a specific example, the secondary load 184 includes an acceleration electrode (e.g., a grid electrode) positioned downstream of an extractor electrode of an ion source as described above, wherein the extractor electrode is the primary load 182. Thus, additional momentum can be transferred to the ions as they are accelerated downstream of the primary load 182 without increasing the applied voltage at the primary load 182 (e.g., by way of staged acceleration through a sequential set of voltage drops). In another variation, the secondary load 184 is a resistive load that can function to dissipate residual charge (e.g., via bleeding off the charge as a current through the resistive load), which can, in examples, increase switching speed (e.g., speed of switching the polarity of the output stage). However, the secondary load 184 can be any other suitable electrical load.

3.9 System Specific Examples

In a specific example, the system includes one controller, one feedback isolator 150, two drive assemblies, and two output assemblies. The first drive assembly 110 has a first inverter 112 and a first transformer, and the first output assembly 120 has a first power rectifier; the first output assembly 120 also generates a positive polarity output sense signal. The second drive assembly 110 has a second inverter 112 and a second transformer, and the second output assembly 120 includes a second power rectifier; the second output assembly 120 also generates a negative polarity output sense signal. The controller 140 receives a voltage magnitude set point (e.g., from an external source, via a direct electrical data connection) and, by way of a direct electrical connection, controls the first and second inverters by way of pulse width modulated (PWM) voltage signals (e.g., transmitted over direct electrical connections between the controller 140 and the inverters) to convert an input direct-current (DC) low power source 170 into a positive polarity (at the first inverter 112 output) and a negative polarity (at the second inverter 112 output) alternating current (AC) waveform at low voltage (e.g., having an RMS voltage magnitude less than one tenth of the desired output voltage magnitude, less than $\frac{1}{100}^{th}$, 0.1% of the desired output voltage magnitude, etc.). Parameters of the PWM voltage signals (e.g., magnitude, duty cycles, frequency, etc.) are determined by the controller 140 according to the voltage magnitude set point, based on feedback received (e.g., by way of direct electrical connection) from the feedback isolator 150. At each drive assembly 110, the low voltage AC waveform is passed through the primary winding of the first and second transformer, respectively, which produces a medium voltage (e.g., a factor of 10 greater than the low voltage, a factor of 2, a factor of 100, a factor of 1000, etc.) AC waveform across the secondary winding of the first and second transformer, respectively. In the first drive assembly 110, which is operated to produce positive polarity high voltage output, the medium voltage AC waveform is directed (e.g., via direct electrical connection) from the first transformer 114 to the positive polarity input of the first power rectifier 122 (e.g., by a polarity selector 130). In the second drive assembly 110, which is operated to produce negative polarity high voltage output, the medium voltage AC waveform is directed (e.g., via direct electrical connection) from the second transformer 114 to the negative polarity input of the second power rectifier 122. The medium voltage AC waveform can be directed to either the positive or negative polarity input(s) of the power rectifier 122 by a controllable switch (e.g., a relay) of the polarity selector 130 connected to the controller 140 and connecting the output of the transformer 114 to either the positive or negative polarity input of the power rectifier 122 dependent upon the state of the switch, wherein the controller 140 can actuate the switch in order to change its state and thereby switch the output polarity of the associated power rectifier 122. The first power rectifier 122 converts the medium voltage AC waveform to a positive high voltage DC output (e.g., by way of a series of voltage doubling circuits, stages, networks, etc.), which can then power a connected load. The feedback isolator 150 is also directly connected to the output of the first power rectifier 122 by a first sense pathway, such that a first output sense signal proportional to the output voltage of the first power rectifier 122 and of the same polarity (e.g., positive) is transmitted to and received by the feedback isolator 150. The second power rectifier 122 converts the medium voltage AC waveform to a negative high voltage DC output (e.g., by way of a series of voltage doubling circuits), which can then power a connected load. The feedback isolator 150 is also directly connected to the output of the second power rectifier 122 by a second sense pathway, such that a second output sense signal proportional to the output voltage of the second power rectifier 122 and of the same polarity (e.g., negative) is transmitted to and received by the feedback isolator 150. The feedback isolator 150 generates two feedback signals: the first feedback signal is generated based on the first output sense signal (e.g., by amplifying, attenuating, filtering, transforming, or performing any other suitable signal processing on the first output sense signal), and the second feedback signal is generated based on a rectified second output sense signal (e.g., based on a positive polarity signal produced upon rectification of the second output sense signal). The two feedback signals are provided to the controller 140 (e.g., via direct electrical connections), which adjusts the output control signals (e.g., the PWM signals) based on deviation(s) of the feedback signals from the output voltage set point (e.g., the PWM duty cycle is increased in order to raise the output voltage when the feedback signals fall below the output voltage set point, a proportional-integral-derivative controller 140 is used with the feedback signals as the inputs and the output control signals as the outputs, etc.); however, the controller 140 can additionally or alternatively adjust the output control signals in any suitable manner to control the output assemblies.

Figure 7:
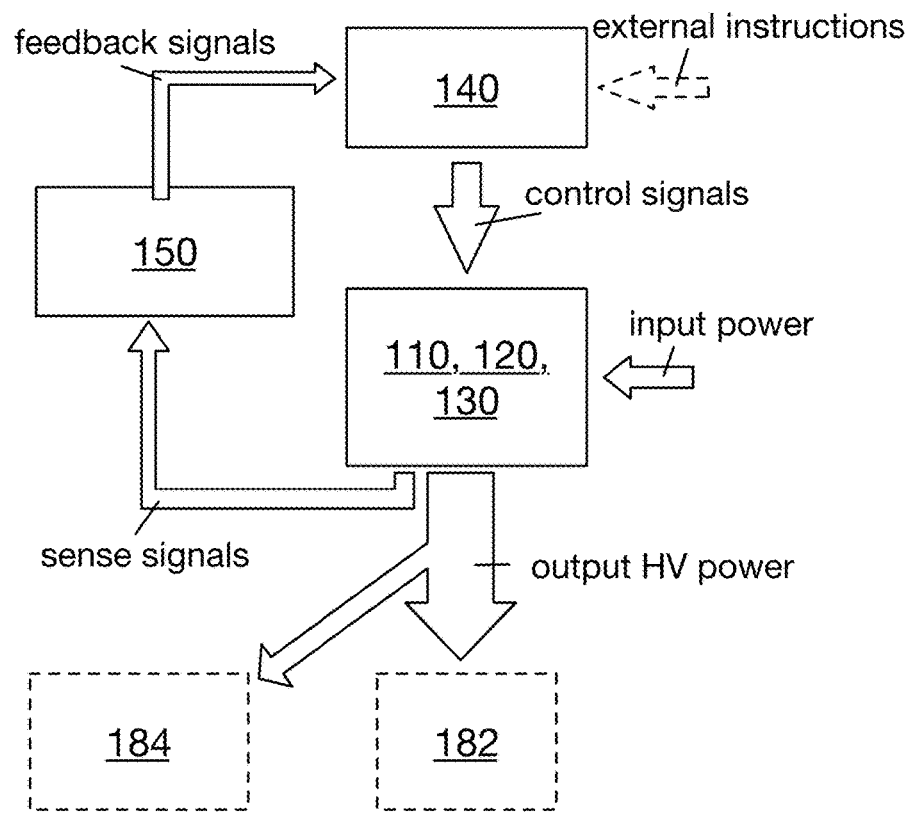
FIG. 7 is a flowchart of data and/or power flows in a variation of the system and example implementation of a variation of the method.

In another example implementation of the system, as shown in FIG. 7, a controller, a drive assembly 110, an output assembly 120, and a feedback isolator 150 are mutually coupled. The controller 140 can generate control signals and provide the control signals to the drive assembly 110, which provides inverted power to the output assembly 120, which receives the inverted input power and transforms the input power into high voltage (HV) output power (e.g., DC output power). The output assembly 120 also generates sense signals (e.g., signals encoding data about the output HV power, such as voltage level, current level, etc.) and provides the sense signals to the feedback isolator 1500. In this example, the feedback isolator 150 isolates the feedback polarity (e.g., rectifies negative polarity feedback to generate positive polarity feedback, and references the feedback to a different potential upon output of the feedback versus the reference of the input sense signals) and generates feedback signals, which the feedback isolator 150 provides to the controller. The controller 140 can generate the control signals based on the feedback signals, external instructions, a combination of feedback signals and external instructions, or based on any other suitable instructions or signals.

Figure 8:
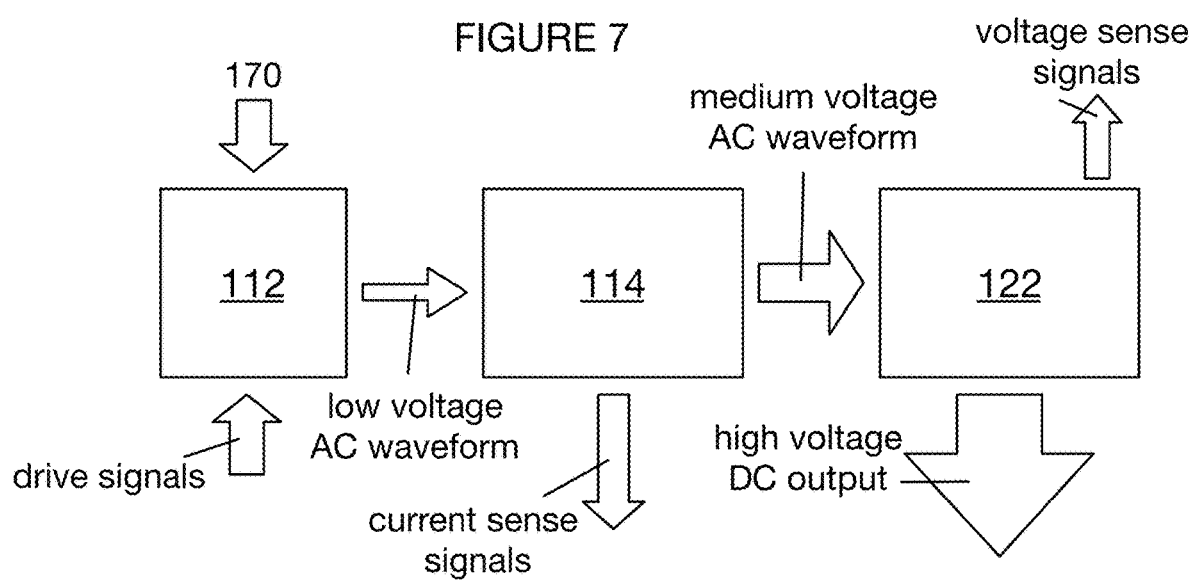
FIG. 8 is a flowchart of data and/or power flows in a variation of a portion of the system and example implementation of a portion of the method.

In another example implementation of the system, as shown in FIG. 8, an inverter, a transformer, and a power rectifier 122 are mutually coupled. The inverter 112 receives low voltage DC input power and drive signals, and converts the low voltage DC input to a low voltage AC waveform (e.g., an output) under control of the drive signals. The transformer 114 transforms the low voltage AC waveform into a medium voltage AC waveform, and provides current sense signals (e.g., signals encoding data about the output current) to an external signal receiver (e.g., a feedback isolator). The power rectifier 122 converts the medium voltage AC waveform into a high voltage DC output, and provides voltage sense signals (e.g., signals encoding data about the output voltage) to an external signal receiver (e.g., a feedback isolator). The power rectifier 122 of this example implementation is preferably a directional power rectifier 122 (e.g., rectifies current flowing in one direction), but can alternatively be non-directional.

4. Method

As shown in FIG. 10, the method 200 includes: transforming an LV DC input into an HV DC output defining an output polarity S210; powering a load with the HV DC output S220; measuring an operating parameter of the load S230; and actuating a polarity selector to switch the output polarity of the HV DC output based on the operating parameter S240. The method 200 can additionally or alternatively include: controlling a setpoint of the HV DC output S222; generating an isolated feedback signal S232; and connecting two or more reference potentials S234. The method is preferably performed using the system disclosed above, but can alternatively be performed using any suitable system.

Block S210 includes: transforming an LV input into an HV output defining an output polarity. Block S210 functions to convert a low voltage input (e.g., input signal) into a high voltage output (e.g., output signal). The LV input is preferably DC (e.g., from a battery, an AC-DC converter, a photovoltaic cell, etc.), but can alternatively be an AC input. The HV output is preferably DC (e.g., for application to a load that utilizes DC power), but can alternatively be AC. Accordingly, the output polarity is preferably constant (e.g., a positive DC output, a negative DC output, etc.) until the polarity is switched (e.g., as in Block S240); however, the output polarity can alternatively be defined instantaneously for an AC output.

Block S210 is preferably implemented by a power supply and components thereof substantially as described above in Section 3; in particular, Block S210 is preferably implemented by a drive assembly 110, polarity selector, and output assembly 120 substantially as described above. However, Block S210 can additionally or alternatively be implemented by and/or in conjunction with any suitable power supply (e.g., a single-polarity output power supply, a polarity-selectable power supply, etc.).

Block S210 can include Block S212, which includes: converting the LV DC input into an LV alternating current (AC) output. Block S212 functions to transform the DC input signal into a form that can be stepped up in voltage by a transformer, which operates on an AC input. Block S212 is thus preferably implemented using an inverter that converts a DC input to an AC output. The inverter is preferably an inverter substantially as described above in Section 3 (e.g., a half bridge MOSFET inverter, a full bridge MOSFET inverter, etc.), but can additionally or alternatively be any suitable inverter or other mechanism for conversion of DC input to AC output.

Block S210 can include Block S214, which includes: converting the LV AC output into a medium voltage (MV) AC output. Block S214 functions to step the voltage of the LV AC output (e.g., the peak-to-peak voltage, the RMS voltage magnitude, etc.) up to a higher value while retaining the AC character of the output. Thus, Block S214 is preferably implemented at a step-up transformer substantially as described above in Section 3; however, Block S214 can additionally or alternatively be implemented using any suitable mechanism for increasing the voltage of an AC input.

Block S210 can include Block S216, which includes: converting the MV AC output into the HV DC output. Block S216 functions to simultaneously increase the voltage of an MV AC signal (e.g., received as an input) to a higher voltage level and convert the MV AC signal to a direct current output (e.g., the HV DC output). Block S216 is preferably implemented at a power rectifier that includes a voltage ladder substantially as described above in Section 3; however, Block S216 can additionally or alternatively be implemented using any suitable mechanism for increasing the voltage of an AC input signal and converting the AC input signal to a DC output (e.g., a second step-up transformer coupled with a full-wave rectifier, half-wave rectifier, and any other suitable rectifier combined with a component that steps up voltage). The output polarity is preferably defined by the state of a polarity selector connected between a transformer (e.g., as implemented in variations of Block S214) and a power rectifier used in variations of Block S216, but can be otherwise suitably defined (e.g., by selecting the polarity of the LV DC input, by selecting the polarity of the HV DC output downstream of the power rectifier or other output, etc.).

In a specific example, Block S210 includes: at a power supply, transforming a first low voltage (LV) direct current (DC) input into a first HV DC output defining an output polarity relative to an HV reference potential, wherein the output polarity is one of a first polarity and a second polarity opposite the first polarity, wherein transforming includes converting the first LV DC input into a first LV alternating current (AC) output at an inverter of the power supply, converting the first LV AC output into a first medium voltage (MV) AC output at a step-up transformer of the power supply, and converting the first MV AC output into the first HV DC output at a power rectifier of the power supply.

Block S220 includes: powering a load with the HV DC output. Block S220 functions to perform electrical work using the HV DC output (e.g., as generated in Block S210). The load can include any suitable load that utilizes high voltage direct current power, including any load substantially as described above in Section 3 (e.g., an ion thruster, a colloid-fueled ion electrospray thruster, an ion source, an ion emitter, an electrostatic particulate scrubber, an extractor grid, an acceleration grid, etc.). However, Block S220 can additionally or alternatively include powering any suitable load in any suitable manner.

In a specific example, Block S220 includes powering an emitter of the ion emitter with the HV DC output. In this example, the ion emitter emits ions having an ion polarity equal to the output polarity of the HV DC output (e.g., generated in Block S210), because powering the ion emitter in this example includes charging the emitter (e.g., vs an extractor) of an electrostatic ion emitter at the HV potential, and extracting opposing-polarity ions from the emitter based on the relative potential between the emitter charged to the HV potential relative to the extractor.

In another specific example, Block S220 includes powering an extractor of the ion emitter with the HV DC output. In this example, the ion emitter emits ions having an ion polarity opposite the output polarity of the HV DC output (e.g., generated in Block S210), because powering the ion emitter in this example includes charging an extractor of an electrostatic ion emitter at the HV potential, and extracting opposing-polarity ions from an emitter using the extractor charged to the HV potential.

The method can include Block S222, which includes: controlling a setpoint of the HV DC output. Block S222 functions to maintain an output characteristic of the HV DC output using a controller. The output characteristic controlled in relation to Block S222 can include: an output voltage, a maximum current drawn by a load, an output current, a maximum voltage ripple, a maximum current ripple, a duration of continuous operation, a duration of continuous operation at a single output polarity, a duration of total operation at a single output polarity, and any other suitable output characteristic. The setpoint controlled in accordance with Block S222 can be, in examples, a voltage setpoint, a current setpoint, and any other suitable setpoint. Block S222 is preferably implemented using a controller 140 and/or components thereof (e.g., a PWM controller 148, a microcontroller) substantially as described above in Section 3; however, Block S222 can additionally or alternatively be implemented using any suitable control system or module.

Block S222 can include controlling a plurality of setpoints associated with multiple HV DC outputs and/or loads. Controlling the plurality of setpoints can, in variations, be based on a desired overall load output characteristic such as a thrust vector (e.g., the net thrust produced by a plurality of ion thrusters), a desired accumulated charge imbalance (e.g., a zero charge imbalance, a positive charge imbalance, a charge imbalance based on an environmental charge, etc.), and any other suitable characteristic. For example, in cases wherein a first and second ion emitter drawing a first and second ion current, respectively, are used, Block S222 can include controlling, at a controller, a first magnitude of the first HV DC output and a second magnitude of the second HV DC output such that the first ion current is greater than the second ion current (e.g., to provide a net positive or negative ion current, to produce a net thrust, etc.). For example, Block S222 can include measuring an environmental charge (e.g., a local charge in the environment around the system), and controlling relative magnitude of the first and second HV DC outputs to generate an accumulated charge imbalance at the system that negates (e.g., opposes in an equal and opposite manner) the environmental charge. However, Block S222 can additionally or alternatively include controlling a plurality of setpoints in any other suitable manner.

Block S230 includes: measuring an operating parameter of the load. Block S230 functions to automatically determine one or more parameters related to load operation while the load is under power (e.g., by way of the HV DC output). The operating parameter can include the output characteristic for which a setpoint is controlled in conjunction with Block S222 (e.g., an output voltage, current draw, etc.). However, the operating parameter may not necessarily include or be represented solely by the output characteristic controlled in relation to Block S222. Block S230 can be performed by and/or in conjunction with various sensors, including a sense signal input of a feedback isolator 150 substantially as described above in Section 3, and/or a space charge sensor (e.g., a potential probe, a Langmuir probe, a conducting surface attached to a voltage transducer, a charge counter, etc.), a thrust sensor (e.g., a thrust balance), a flowrate monitor (e.g., a propellant flow meter, an ion flowrate monitor, etc.), a pressure sensor (e.g., a propellant tank vapor pressure monitor), a current monitor (e.g., to measure ion current drawn by the load), a temperature sensor (e.g., a thermocouple to monitor thruster temperature, a thermistor to monitor power supply component temperatures, etc.), and any other suitable sensors. Sensor outputs can be processed by a controller substantially as described above in Section 3 in variations of Block S230. However, Block S230 can additionally or alternatively include measuring an operating parameter of the load in any other suitable manner.

In relation to Block S230, an operating parameter can include various parameters relevant to load operation. For example, the operating parameter can include: current drawn by the load, voltage applied to the load, thrust produced by the load, space charge generated by the load (e.g., as a result of ion emission), parasitic current drawn by a portion of the load, temperature of the load, load status (e.g., a qualitative status such as 'nominal' vs. 'off-nominal' operation, a quantitative status such as a percentage of maximum allowable current being drawn, etc.), and any other suitable parameter. The operating parameter can additionally or alternatively include any parameter and/or variable described above in Section 3 in relation to a primary load 182, a secondary load 184, and any other suitable load.

In a specific example, Block S230 includes measuring, at a controller of the power supply, an operating parameter of an ion emitter. However, Block S2230 can additionally or alternatively include otherwise suitably measuring any suitable operating parameter of any suitable load.

The method can include Block S232, which includes: generating an isolated feedback signal. Block S232 functions to detect a sense signal from a high voltage output (e.g., the HV DC output), which is referenced to a first reference potential (e.g., an HV reference potential), and produce a feedback signal that is proportional to the sense signal value but is referenced to a second reference potential (e.g., an LV reference potential). Block S232 is preferably performed using a feedback isolator substantially as described above in Section 3, but can additionally or alternatively be performed using any other suitable isolation mechanism that electrically decouples (e.g., isolates) the reference potentials between two or more signals (e.g., a third winding of the transformer).

The method can additionally or alternatively include generating a feedback signal, wherein the feedback signal is not isolated. For example, the feedback signal can be referenced to the first reference potential (e.g., the same reference potential as that of the sense signal and various other portions of the system). However, the method can include generating feedback signals that are isolated or non-isolated in any other suitable manner.

The method can include Block S234, which includes: connecting two or more reference potentials. Block S234 functions to equalize the reference potentials of two or more signals. Block S234 can also function to pull a virtual ground (e.g., to which the HV output is referenced) to a chassis ground (e.g., to which a control signal or feedback signal is referenced) to affect an output characteristic of the output assembly 120 (e.g., the output voltage, the maximum allowed output current, etc.). Block S234 can also function to selectively switch control of the output power (e.g., of the power supply) from an analog or passive charge-balancing mode to a digital or active charge-balancing mode, wherein a controller can actively control charge balancing (e.g., by computing and controlling the drive assemblies based on output feedback instead of a closed feedback loop using analog or passive control). Block S234 is preferably performed using a crowbar switch substantially as described above in Section 3, but can additionally or alternatively be performed using any suitable electrical-connection mechanism or switch.

Block S240 includes: actuating a polarity selector to switch the output polarity of the HV DC output. Block S240 functions to change the output polarity of the HV DC output between positive and negative polarity. Block S240 is preferably performed based on an operating parameter (e.g., a value of the measured operating parameter in variations of Block S230), but can additionally or alternatively have any suitable basis. For example, Block S240 can include actuating the polarity selector based on an accumulated charge imbalance measured at a space charge sensor, wherein an accumulated charge imbalance of a threshold charge value triggers actuation of the polarity selector and emission of ions of a suitable polarity to negate the accumulated charge imbalance. In another example, Block S240 can include actuating the polarity selector to selectively build up space charge, wherein the magnitude and polarity of the space charge can be determined based on the operation environment (e.g., wherein the operation environment removes space charge of a given polarity at a given rate, as determined from the operating parameter; wherein the operation environment is associated with a target space charge magnitude and polarity; etc.). In another example, Block S240 includes actuating the polarity selector based on an elapsed time, wherein after a predetermined elapsed time the output polarity is switched (e.g., periodically). However, Block S240 can have any other suitable basis.

Block S240 is preferably performed subsequent to Block S214 and prior to Block S216 (e.g., by a polarity selector arranged between the secondary stage of the step up transformer and the input stage of the power rectifier). However, Block S240 can alternatively be performed after power rectification to a HV DC output, prior to inversion at the LV AC output, and at any other suitable location (or time point) in the input-output transformation chain (e.g., between the LV DC input and the HV DC output).

In a specific example, Block S240 includes actuating a polarity selector of the power supply, using a controller of the power supply, based on a measured operating parameter. In this example, actuating the polarity selector is performed simultaneously with powering the load (e.g., an ion emitter), without cessation of power to the load (e.g., operating the load continuously while switching the polarity). In this example, the polarity selector is arranged between a step-up transformer and a power rectifier of the power supply, actuating the polarity selector switches the output polarity between the first polarity and the second polarity.

In a related example of Block S240, the operating parameter includes an ion current emitted by an ion emitter, and actuating the polarity selector is performed at an actuation frequency. The actuation frequency in this example has an actuation period, and the actuation frequency is determined (e.g., by the controller and based on the measured ion current) in order to maintain the net current at zero (e.g., a net sum of ion currents associated with positive ions and negative ions over the period is equal to zero, such that little to no space charge is generate). Note that the relationship between actuation frequency and actuation period is preferably the period of time over which a full cycle of actuation has occurred (e.g., from positive, to negative, and back to positive); however, the actuation period can be otherwise suitably defined (e.g., as the inverse of the actuation frequency). In a specific example, the actuation frequency is 0.1 Hz (e.g., the polarity is switched every 10 seconds), and the actuation period in this example is 20 seconds (e.g., wherein a full cycle of both a first polarity and second polarity are experienced at the high voltage output). However, the actuation frequency and period can be otherwise suitably related.

In a related example of Block S240, the operating parameter includes an accumulated charge imbalance associated with an ion emitter (e.g., emitting ions of a single polarity over a period of time), and Block S240 includes switching the output polarity based on the accumulated charge imbalance exceeding a threshold value (e.g., the charge value exceeding a threshold charge value, the voltage difference between the spacecraft potential and a reference potential, etc.).

In another example, Block S240 includes maintaining two output polarities (e.g., associated with two output assemblies of a power supply) in opposition during actuation. In this example, Block S240 includes maintaining the first output polarity and the second output polarity as opposing polarities. This example can include maintaining a first ion current drawn by a first ion emitter substantially equal to and opposite in polarity to a second ion current drawn by a second ion emitter; however, this example can additionally or alternatively include maintaining the voltage of the HV DC outputs at opposite polarities. This example of Block S240 can be implemented in conjunction with variations of Block S222, wherein the output value (e.g., voltage level) is maintained (e.g., at a setpoint) in accordance with Block S222 and the polarities are maintained in accordance with Block S240.

The method 200 and Blocks thereof can additionally or alternatively include performing any suitable action in relation to the function(s) as described above with regard to the system 100, components of the system 100, and/or similar systems and components.

Although omitted for conciseness, the embodiments include every combination and permutation of the various system components and the various method processes, including any variations, examples, and specific examples, where the method processes can be performed in any suitable order, sequentially or concurrently using any suitable system components.

The system and method and embodiments thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A polarity-selectable power supply comprising:
 a first power source configured to output a positive polarity direct current (DC) voltage;
 a second power source configured to output a negative polarity DC voltage;
 a drive assembly configured to receive a first DC voltage and output an alternating current (AC) voltage;
 an output assembly electrically coupled to the drive assembly, wherein the output assembly is configured to transform the AC voltage into a second DC voltage, wherein the second DC voltage is greater than the first DC voltage; and
 a polarity selector coupled between the first and second power source and the drive assembly, the polarity selector comprising a set of switches operable between a first configuration and a second configuration, wherein:
  in the first configuration the set of switches directly electrically connects the first power source to the drive assembly and electrically isolates the second power source from the drive assembly wherein a polarity of the first DC voltage is a positive polarity; and
  in the second configuration: the set of switches directly electrically connects the second power source to the drive assembly and electrically isolates the first power source from the drive assembly, wherein the polarity of the first DC voltage is a negative polarity.

2. The power supply of claim 1, wherein the output assembly comprises a full-wave voltage doubling stage.

3. The power supply of claim 1, further comprising a controller configured to operate the set of switches between the first configuration and the second configuration.

4. The power supply of claim 3, further comprising:
a voltage sensing circuit electrically coupled to the output assembly;
wherein the controller is communicably coupled to the polarity selector, wherein the controller operates the set of switches between the first configuration and the second configuration based on a signal received from the voltage sensing circuit.

5. The power supply of claim 4, wherein the drive assembly and the output assembly are referenced to a first reference potential and the voltage sensing circuit is referenced to a second reference potential.

6. The power supply of claim 1, wherein the drive assembly comprises:
a center-tapped transformer comprising a primary winding and a secondary winding, wherein the primary winding comprises a center tap electrically couplable to the first DC voltage, and wherein the secondary winding is electrically coupled to the output assembly;
a first drive assembly switch comprising a first side and a second side, wherein the first side of the first drive assembly switch is connected to a first end of the primary winding; and
a second drive assembly switch comprising a first side and a second side, wherein the first side of the second drive assembly switch is connected to a second end of the primary winding, and wherein the second side of the first drive assembly switch is connected to the second side of the second drive assembly switch.

7. The power supply of claim 6, wherein the first drive assembly switch and the second drive assembly switch each comprise a bijunction transistor (BJT).

8. The power supply of claim 6, wherein the first and second drive assembly switches each comprise a gate connection to a gate driver.

9. The power supply of claim 1, wherein the output assembly is electrically coupled to a load, wherein the load comprises an ion emitter that emits cations when the set of switches is in the first configuration and anions when the set of switches is in the second configuration.

10. The power supply of claim 9, wherein the ion emitter is part of a thruster operable in low-earth orbit.

11. A polarity-selectable power supply comprising:
a first power source configured to output a positive polarity direct current (DC) voltage;
a second power source configured to output a negative polarity DC voltage;
a drive assembly configured to receive a first DC voltage and output an alternating current (AC) voltage;
an output assembly electrically coupled to the drive assembly, wherein the output assembly is configured to transform the AC voltage into a second DC voltage; and a polarity selector operable between a first configuration and a second configuration, wherein:
in the first configuration, the polarity selector directly electrically connects the first power source to the drive assembly, and electrically isolates the second power source from the drive assembly; and
in the second configuration, the polarity selector directly electrically connects the second power source to the drive assembly, and electrically isolates the first power source from the drive assembly.

12. The power supply of claim 11, wherein the drive assembly comprises:
a center-tapped transformer comprising a primary winding and a secondary winding, wherein the primary winding comprises a center tap electrically couplable to the first DC voltage, and wherein the secondary winding is electrically coupled to the output assembly;
a first drive assembly switch comprising an upstream and a downstream side, wherein the upstream side of the first drive assembly switch is connected to a first side of the primary winding; and
a second drive assembly switch comprising an upstream and a downstream side, wherein the upstream side of the second drive assembly switch is connected to a second side of the primary winding, and wherein the downstream side of the first drive assembly switch is connected to the downstream side of the second drive assembly switch.

13. The power supply of claim 12, wherein the first drive assembly switch and the second drive assembly switch each comprise a bijunction transistor (BJT).

14. The power supply of claim 11, wherein the second DC voltage is greater than the first DC voltage.

15. The power supply of claim 11, wherein:
in the first configuration, the first DC voltage comprises the positive polarity DC voltage; and
in the second configuration, the first DC voltage comprises the negative polarity DC voltage.

16. The power supply of claim 11, wherein a polarity of the second DC voltage is the same as a polarity of the first DC voltage.

17. The power supply of claim 11, wherein the output assembly comprises a full-wave voltage doubling stage.

18. The power supply of claim 11, further comprising a controller configured to operate the polarity selector between the first configuration and the second configuration.

19. The power supply of claim 18, further comprising:
a current sensing circuit electrically coupled to the output of the output assembly;
wherein the controller is configured to operate the polarity selector based on a signal from the current sensing circuit.

20. The power supply of claim 11, wherein the output assembly is electrically coupled to a load, wherein the load comprises an ion extractor that emits anions when the polarity selector is in the first configuration and cations when the polarity selector is in the second configuration.

* * * * *